United States Patent [19]

Turley

[11] 4,212,193
[45] Jul. 15, 1980

[54] APPARATUS AND METHOD FOR DETERMINING THE MOMENT OF INERTIA OF GOLF CLUBS AND LIKE OBJECTS

[76] Inventor: John W. Turley, 14 Pine St., Oxford, Conn. 06483

[21] Appl. No.: 966,802

[22] Filed: Dec. 6, 1978

[51] Int. Cl.³ .............................................. G01M 1/10
[52] U.S. Cl. ........................................ 73/65; 73/579; 273/77 A
[58] Field of Search ............... 73/65, 570, 579, 580, 73/583, 666; 273/77 A

[56] References Cited

U.S. PATENT DOCUMENTS

| | | | |
|---|---|---|---|
| 2,349,736 | 5/1944 | Knobel et al. | 73/65 |
| 3,395,571 | 8/1968 | Murdoch | 73/579 |
| 3,473,370 | 10/1969 | Marciniak | 73/65 |
| 3,926,271 | 12/1975 | Patashnick | 73/580 X |
| 4,070,022 | 1/1978 | Braly | 73/579 |

Primary Examiner—Charles A. Ruehl

[57] ABSTRACT

Apparatus and method of measuring moment of inertia of golf clubs and like objects, about an axis remote from the center of gravity, in which object to be tested is mounted in the apparatus so that said axis is vertical and object is oscillated about said axis in a horizontal plane. Low cost electronic means are used to measure period of oscillation and to compute and display the moment of inertia of said object about said axis.

2 Claims, 10 Drawing Figures

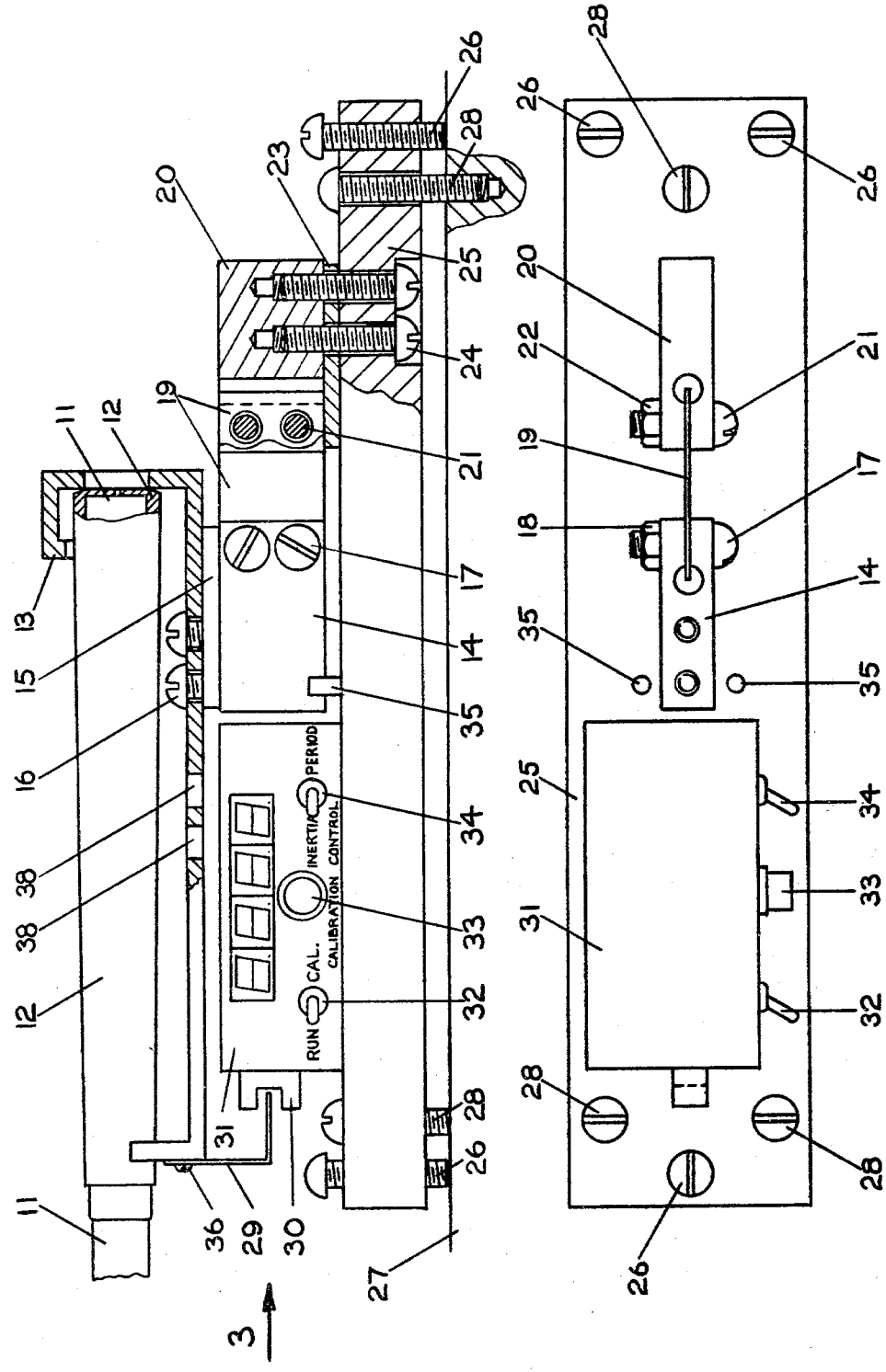

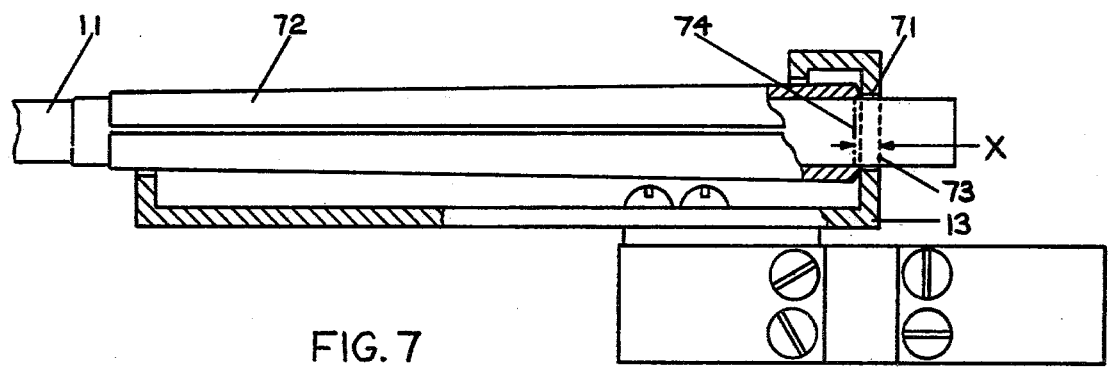
FIG. 7
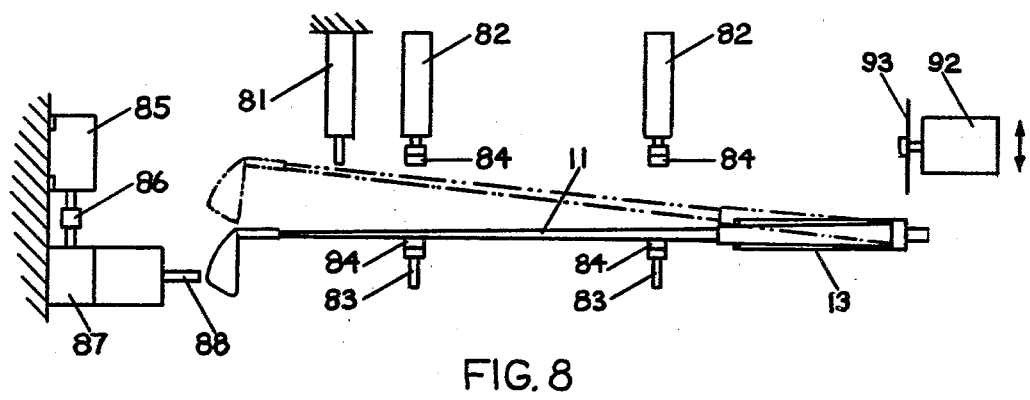
FIG. 8
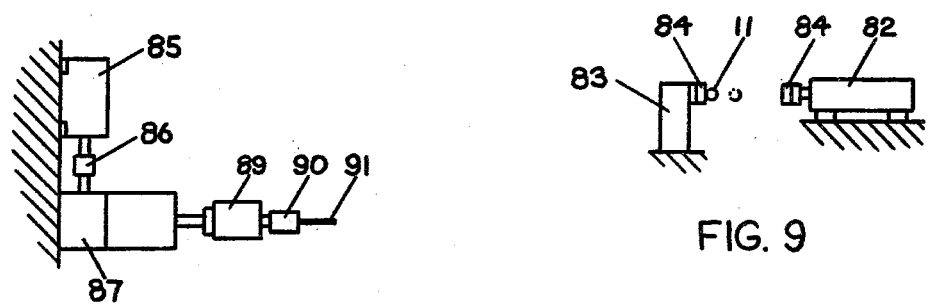
FIG. 9
FIG. 10

APPARATUS AND METHOD FOR DETERMINING THE MOMENT OF INERTIA OF GOLF CLUBS AND LIKE OBJECTS

In order to determine the "feel" of golf clubs, baseball bats and like objects to the user, it is generally accepted that the moment of inertia of said objects about an axis through the center of rotation provides the best measure of the "feel" of said objects, because the torque, which must be applied by the user in order to accelerate such objects to obtain a given velocity at the point of impact with the ball, is directly proportional to said moment of inertia.

The position of the axis of rotation of any such object varies to some extent with the physical build of the user, but it is invariably situated at some point remote from the center of gravity of said object.

Apparatus according to the prior art for measuring moment of inertia consists of a torsion balance of some kind which is used to measure the period of oscillation of the object when rotated about a vertical axis through its center of gravity. From this measurement, the moment of inertia through the center of gravity can be calculated. The moment of inertia about the center of rotation can only be obtained indirectly. Firstly the mass of the object, and also the distance from the center of gravity to the center of rotation must be measured. Then the following formula, known as the theorem of parallel axes, can be used to calculate the moment of inertia about the center of rotation.

$$Icr = Icg + M.R^2$$

where $Icr$ = Moment of Inertia about the axis of rotation
$Icg$ = Moment of Inertia about an axis which passes through the center of gravity, and is parallel to the axis of rotation
$M$ = Mass
$R$ = distance from center of gravity to axis of rotation.

There are a number of disadvantages to this method. Firstly, three separate measurements must be made, which is a time consuming and expensive process. Secondly, the measurement accuracy is limited by the combined errors of the three individual measurements. The R measurement is particularly critical as any error in R is exaggerated by the squaring in the above formula.

Thirdly, this method does not lend itself to use on a production line, due to the complex procedure, the necessity for calculation, the fragility of the torsion balance mechanism, (usually a wire suspension) and the necessity to adjust the object on the torsion balance carefully until the center of gravity of said object lies on the axis of the torsion balance suspension.

One other method of determining moment of inertia has been proposed (U.S. Pat. No. 3,703,824) which relies upon static unbalance measurement, together with a length measurement, but this method is also indirect and is even less accurate than the torsional pendulum method (though faster)

Measurement accuracy is particularly important in the case of golf clubs, where it is desirable to match the moment of inertia about the axis of rotation (dynamic swing weight) of each individual club in a set of twelve or more clubs. Typically the human user is sensitive to a variation in moment of inertia (or most other physical parameters, if the user operates devices having such parameters on a regular basis, and so achieves skill and experience) of about 1 percent. This observation is based on certain well known examples—such as that, to a skilled billiard player, a 17½ ounce cue feels much different from a 17 ounce cue, (approx. 3 percent difference); to a skilled golfer, a driver shortened by ½ in. feels much different and easier to swing than before, (44 to 43½ in. results in just over 2 percent reduction in moment of inertia); an athlete might be able to run 100 yards in 10.2 seconds consistently, but never be able to do it in 10 seconds (2 percent) and so on.

It is a well known principle of measurement that the measuring device should have an inherent accuracy one order of magnitude higher than the required accurace of the measurement. Therefore, with a torsion balance according to the prior art, the maximum required error of 0.1 percent in the final result would dictate a maximum error of 0.03 percent in the three individual measurements—this would be very hard to achieve at a modest cost. In fact, because of the disadvantages of prior art methods of measuring inertia about an axis through the swing center of golf clubs in particular, the old method of measuring the static unbalance of the clubs (U.S. Pat. No. 1,953,916)—the so-called static swing weight, is still used virtually universally throughout the industry, despite its generally accepted limitations. The reason is that this measurement method measures one variable only (static unbalance moment about a center 12 in. or 14 in. below the grip end of the club), and a high accuracy (of the order of 0.1 percent) can be achieved. The result is that a set of golf clubs matched statically will, in general, have a gradually increasing dynamic swing weight from the 9 iron through to the driver (up to 10 percent typically) but at least the variation is gradual and fairly consistent from set to set.

If a set of clubs were manufactured with matched dynamic swing weights, using prior art methods of matching, an unacceptable and random variation in dynamic swing weight from club to club could be expected due to the limitations in accuracy of said prior art methods.

The present invention consists of a device for, and method of measuring the moment of inertia about any axis for any object, using a single measurement for maximum accuracy. In particular it is intended that said means be used for measuring moment of inertia about the swing center of such objects. The invention also comprises means for normalizing said measurement to give direct readout of said moment of inertia, and means for automatic operation to enable said moment of inertia to be adjusted to the desired value in the last stages of manufacture.

The invention will now be described with reference to the accompanying drawings.

FIG. 1 shows a front elevation of one embodiment of the present invention, used for measuring moment of inertia of golf clubs.

FIG. 2 shows a plan view, partly cut away, of said embodiment.

FIG. 7 shows a partial front elevation of said embodiment with a golf club mounted thereon, showing how the golf club position can be adjusted to determine the correct amount of top trim of the shaft to achieve the required moment of inertia.

FIGS. 8, 9 and 10 show another embodiment of said invention used to obtain the required moment of inertia for any club on a production line basis.

Figure 3:
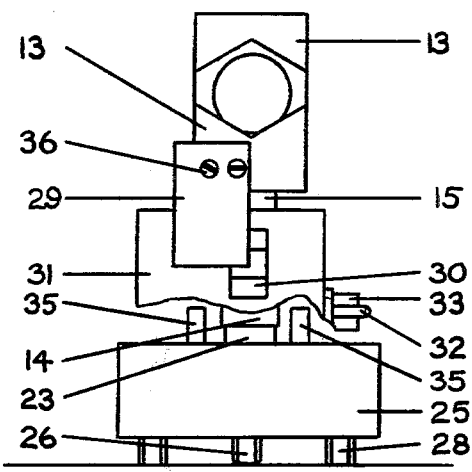
FIG. 3 shows a side view of said embodiment, taken from direction 3 of FIG. 1.

Like prior art devices for measuring moment of inertia, the subject invention provides a virtually zero friction pivot for mounting the object whose moment of inertia is to be measured, and also provides a spring to provide a restoring torque proportional to angular displacement from the neutral point. (for which the restoring force is zero) As in prior art devices of the taut wire suspension type, the restoring force as well as the pivot is provided by a flexing member. In the case of the subject invention, however, a novel feature is that the pivot/spring, or suspension, element is also designed to support the static unbalance of the object to be measured. In this way the object can be mounted with the center of rotation remote from the center of gravity of said object. As in prior art devices, to eliminate the effect of gravity upon the measurement, the pivot axis is arranged to be vertical, with the plane of rotation of said object horizontal.

By providing an initial angular offset to the object, and then releasing it, the object will oscillate back and forth upon the suspension member, and the period of such oscillation is given, according to the classical theory, by the relationship $$P = 2\pi \sqrt{Icr/K.G}$$

where in compatible units P=period (sec)
  Icr is as defined previously (lb-in$^2$ units)
  K=stiffness of suspension element (lb-in/radian)
  G=gravitational constant (386.4 in/sec$^2$)

Due to damping of the oscillation caused by air friction and hysteresis in the flexing member, the oscillation amplitude gradually dies away, but, typically, with the device according to the subject invention, well over 100 useful cycles can be achieved.

The period of the oscillation may be measured using a photo-electric transducer and electronic counter according to the prior art, and the period displayed, with a conversion chart or table used to calculate the absolute inertia value. (the device having been previously calibrated using an object of simple shape having a known moment of inertia) Alternatively, computing elements, a microprocessor or the like, can be used to calculate and display the moment of inertia directly. A third alternative, enabling moment of inertia to be displayed directly with simple low cost elements, is disclosed in subject application, and forms part of the present invention.

In FIG. 1, an embodiment used for measuring moment of inertia of golf clubs, the suspension element consists of a flat metallic spring 19 which is mounted in a vertical plane, and clamped by clamp blocks 14 and 20. Clamp screws 21 and nuts 22 (FIG. 2) hold spring 19 firmly in stationary clamp block 20, which itself is anchored firmly to base 25 by means of screws 24 and spacer 23. Levelling screws 26 are used to set the assembly level, and holddown screws 28 hold said assembly rigidly in place on a solid foundation such as a floor, heavy workbench or shelf (27).

Clamp screws 17 and nuts 18 (FIG. 2) hold spring 19 firmly in moving clamp block 14, and movement of block 14, which can occur virtually only in a horizontal plane, and by lateral flexure of said spring, is limited by stops 35, mounted within base 27. Said stops prevent excessive deflection, and possible overstressing of said spring. Club holder 13 is mounted on moving block 14 by means of screws 16 and spacer 15. A partial view of a golf club, including shaft 11 and grip 12, is shown in FIG. 1, and it can be seen that the grip end of the golf club lies vertically in line with the vertical center line of said spring, and so the assembly is set up as shown in FIG. 1 to measure moment of inertia of the golf club about an axis passing through the grip end of the club.

If a golf club is mounted in holder 13 as shown, and the club, which will be rigidly connected to the moving assembly consisting of holder 13, screws 16 and 17, spacer 15, clamp block 14 and nuts 18, is displaced horizontally until said clamp block touches stop 35, and then released, the club and moving assembly will oscillate with a natural period of oscillation related to the moving inertia and suspension stiffness by the formula given above.

Interrupter plate 29 is mounted to holder 13 by means of screws 36. Said plate is used to interrupt a light beam passing from source to detector within photo-electric sensing element 30. As can be seen in FIG. 3, in the neutral position of said spring (as drawn) the interrupter plate covers half of the element 30. In this way, for each cycle of oscillation, the light beam is interrupted for ½ of the cycle, and the electrical output from the sensing element will approximate a square wave of the same period as the period of mechanical oscillation, and this period is measured by the electronic counter 31. In this way, even though the amplitude of the mechanical oscillation gradually decays, this decay will have no effect upon the period of the electrical output produced by the sensing element.

FIGS. 2 and 3 provide further views of said embodiment. In particular FIG. 3 shows the Vee shaped notches provided in holder 13 enabling the club to be held firmly attached to said holder without the use of complex clamping mechanisms. This allows each club to be quickly loaded and unloaded. Note that in FIG. 3 the club 11, 12 and screws 26, 28 have been omitted for the sake of clarity.

Figure 4:
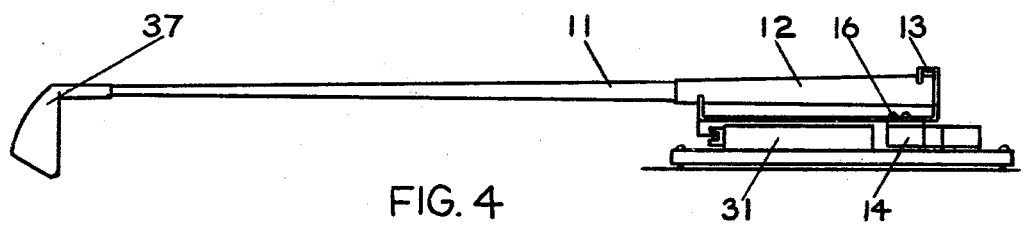
FIG. 4 shows said embodiment with a golf club mounted thereon.
Figure 5:
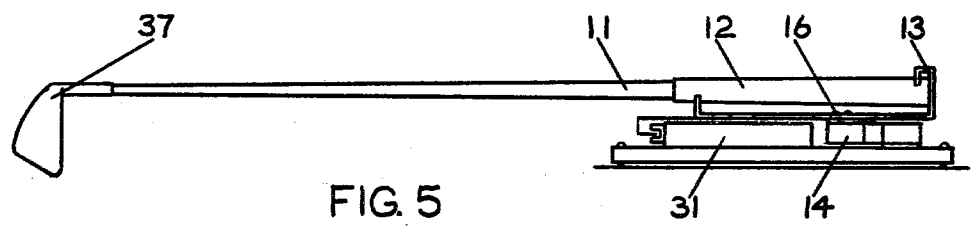
FIG. 5 shows said embodiment with golf club mounted thereon, but used to measure moment of inertia about another axis of rotation.

In FIG. 4 the same assembly is shown to a reduced scale, so that the relative position of club head 37 can be seen. In FIG. 5 the same assembly is shown but this time the club holder 13 is attached to moving clamp block 14 by means of screws 16 passing through a second pair of holes 38 (FIG. 1) in said holder. With the device set up in this way, the moment of inertia of any club about an axis below the grip end of the club can be directly measured, the axis being established by the distance of holes 38 from the first set of mounting holes in said holder. In a similar way, by suitable location of mounting holes, (and, if required, modification of the profile of holder 13), moments of inertia about any axis from considerably above, to considerably below the grip end of any club can be directly measured.

This feature is of particular value, because there is some doubt as to the true location of the axis of rotation during a golf swing—opinions seem to vary from about 2 inches above the top end to about 5 inches below. Said axis is probably located close to the position of the left wrist. (for a right-handed golfer) It is anticipated that in due course, for the purposes of standardization in golf club manufacture and testing, a fixed center of rotation will become standard, and the device of the invention could then be standardized to provide this fixed center relative to the top end of the club.

Figure 6:
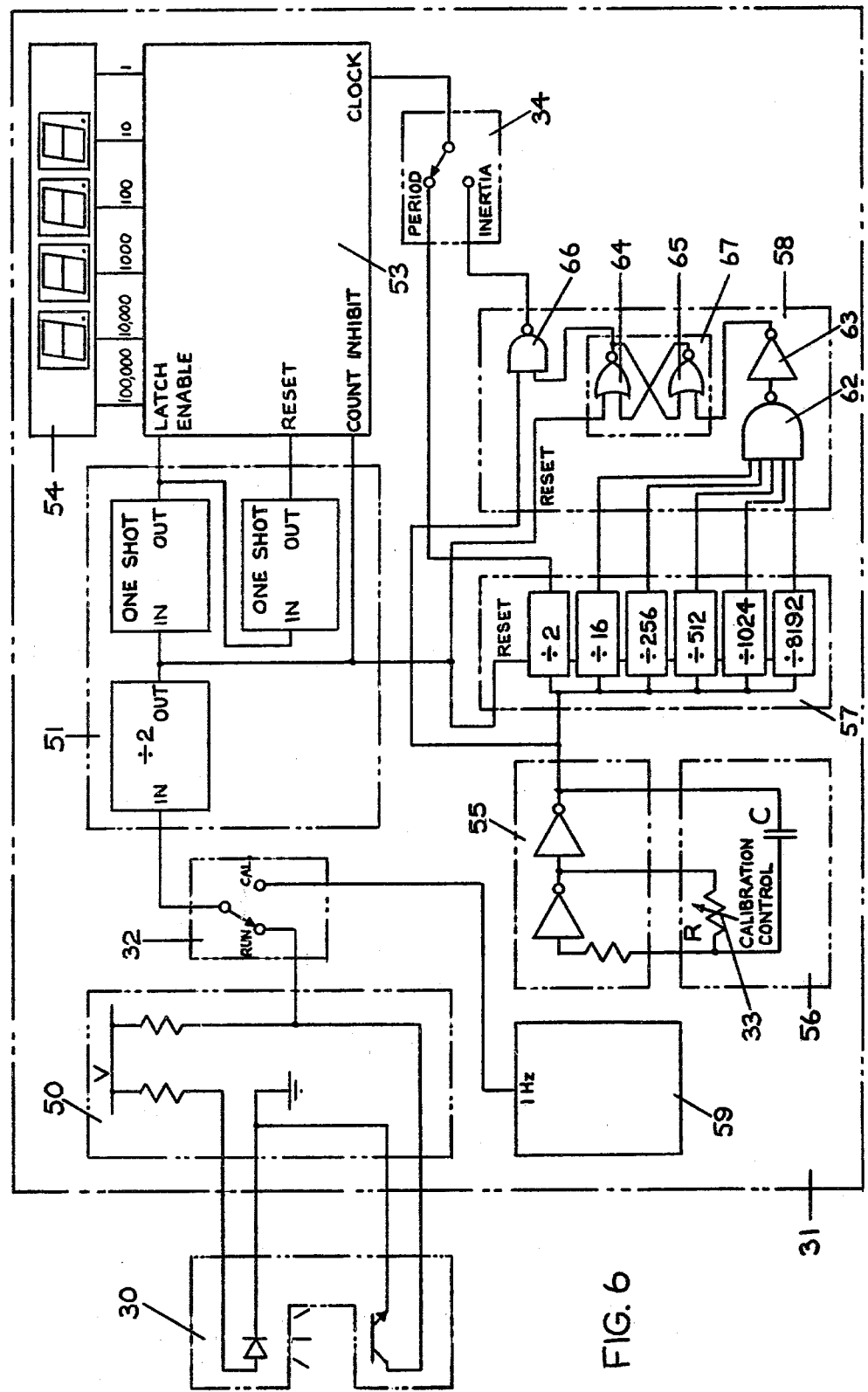
FIG. 6 shows a schematic of the electronic readout system according to the present invention and used in said embodiment.

The construction of sensing element 30 and electronic counter 31 are shown schematically in FIG. 6. Said sensing element is a standard commercial unit consisting of a U-shaped housing, with a light-emitting diode (L.E.D) mounted in one leg, and a photo transistor in the other leg. Detector circuit 50 (part of electronic counter 31) is used to supply current to said L.E.D., and to provide the correct load to said phototransistor, so that, as interrupter plate 29 alternately blocks and exposes the light beam passing from said L.E.D. to said phototransistor, the voltage output from the detector alternates between logic 0 (0 volts approx) and logic 1 (V volts approx) levels, at a frequency equal to the frequency of mechanical oscillation.

Electronic counter 31 contains twelve sub-units. These are detector, (50), counter control, (51), counter, (53), digital display unit, (54), oscillator, (55), frequency trimmer, (56), frequency divider, (57), oscillator gate, (58), calibration oscillator divider (59), run/calibrate switch, (32), and period/inertia switch (34)

Counter (53) could be any commercially available integrated circuit (such as the INTERSIL ICM 7208) capable of driving directly at least five seven-segment light emitting diode digit displays. Such circuits will count pulses at their clock input, and provide to the display the total count at the instant that the latch enable input terminal was last provided with a "latch enable" pulse. The count circuits can be reset to zero by a pulse on the "reset" input terminal.

Counter control circuit (51) is a conventional circuit for period counting consisting of a divide-by-two circuit, and two one-shot circuits.

This circuit provides three functions (A) the divide-by-two circuit gates said counter to count during alternate cycles only. At the completion of a count cycle, the divide-by-two circuit stops the count, then (B) the first one shot circuit supplies a pulse to the counter which transfers the total count for said count cycle to the display. The second one shot circuit then (C) supplies a pulse to said counter to reset the count to zero. At the start of the next count cycle, the divide-by-two circuit changes state, and allows the next count to commence. The sequence then repeats itself for as long as there is a cyclic input to the divide-by-two circuit.

Oscillator (55) is a conventional oscillator which can be tuned by adjustment of the variable resistor R in frequency trimmer (56) using the calibration control (33).

Frequency divider (57) is a standard integrated circuit and consists of thirteen binary divider stages, and gives output frequencies of $f \div 2$, $f \div 16$, $f \div 256$, $f \div 512$, $f \div 1024$ and $f \div 8192$, where f is the input frequency.

Calibration oscillator/divider (59) is a standard commercially available type as used commonly for watches, clocks etc. consisting of a quartz crystal and divider stages, and giving a highly stable output frequency of 1 Hz.

Digital display unit (54) consists of a commercially available 4 digit seven segment light emitting diode (L.E.D.) display, and can also include current limiting resistors and/or driver transistors so that said unit can be directly driven by the counter (53). Electronic counter 31 is also provided with a suitable electrical power supply according to prior art.

For initial adjustment of frequency trimmer (56), an object of known moment of inertia about the axis of rotation, preferably of 1000 lb-in$^2$, is mounted in club holder 13, and is set into mechanical oscillation by providing an initial displacement. With switch 32 set to "run" and switch 34 set to "period", the display unit (54) will display the number of pulses appearing at the clock input during alternate periods of the oscillation, the clock input frequency being half the oscillator frequency. Calibration control is adjusted so that 10,000 pulses are counted, and the display reads 1000, for an object having a moment of inertia of 1000 lb-in$^2$ or, in general, a number of pulses equal to the known moment of inertia are displayed. It is envisaged that the actual period will vary from unit to unit, due primarily to variation in thickness of spring 19, but will be in the range 2 to 3 seconds for an inertia of 1000 lb-in$^2$. The oscillator frequency in this case will thus be in the range 6,667 Hz to 10,000 Hz, the clock input frequency (oscillator frequency divided by two by frequency divider 57) will be in the range 3,333 Hz to 5,000 Hz, and the display will read 1000. Switch 32 is then set to the "cal" or calibrate position. The electronic counter (31) now no longer indicates the period of the mechanical oscillation, but now indicates the period (in ½ cycles of the oscillator) of the precise 1 HZ square wave supplied by calibration oscillator/divider 59. The reading thus obtained (which is also equal to half the frequency of oscillator 55) is recorded as a permanent calibration for the instrument, which can subsequently be calibrated at any later date without using an object of known moment of inertia, simply by switching switch 32 to "cal" and trimming calibration control 33 until the recorded calibration frequency is indicated.

In order to measure the moment of inertia of any golf club, the club is first placed in holder 13, electronic counter 31 is switched on, switch 32 is set to "run", and switch 34 is set to "period". The golf club is displaced and allowed to oscillate, and the period, after the oscillation has settled down, is noted. If P is the period, and t is the period of oscillation of the tester with the golf club removed, then the club moment of inertia is given by the formula $$I = Ical \times (P^2 - t^2)/(Pcal^2 - t^2) \qquad (i)$$

where Pcal is the corresponding period measured for the object having a moment of inertia (known) of Ical. Since the oscillator frequency was set up to give Pcal=1000 (i.e. a display of 1000) for Ical=1000 then this equation becomes $$I = 1000 \, (P^2 - t^2)/(1,000,000 - t^2) \qquad (ii)$$

If the tester is designed so that Pcal $>>$ t $<<$ P then this equation can be simplefied to:

$$I = Ical \times P^2/Pcal^2 = P^2/1000 \text{ (lb-in}^2\text{)} \qquad (iii)$$

In fact, for the tester described above t=50 approx., and provided 850<I<1200 lb-in$^2$ (which is true for virtually all golf clubs) the error due to using equn. (iii) is always less than 0.05% (absolute) and can be neglected.

However, it is not always convenient to have to calculate moment of inertia from the period measurement, even using such a simple equation as equation (iii). For this reason, the embodiment described above includes means for displaying club moment of inertia directly.

For typical golf club I values, (in the range 850 to 1180 lb-in$^2$) then, based upon Ical=1000 lb-in$^2$, and Pcal=2000, equn. (iii) can be approximated by $$I = 2 \, Ical \, \frac{(P - \frac{1}{2}Pcal)}{Pcal} \quad \text{(iv)}$$

Equn. (iv) gives values of I within 1 percent of the values of I obtained from equn. (iii) and enables much simpler electronic circuitry to be used. Moreover, the deviation of I values of equn. (iv) from the I values obtained from equn. (iii) is always constant and predictable, provided that the same value of Ical is always used, which it can be, according to the method of the present invention.

It is of no great importance, in the case of golf clubs, to measure golf club inertia in any particular set of units. It is here proposed that a new scale of golf club inertia be adopted, based upon equation (iv). We propose to call this the turley scale. The unit of this scale would be very close to lb-in$^2$ units, and would only deviate in a known and predictable fashion (as calculated by comparison of results of equns (iii) and (iv) and tabulated below)

| I (lb-in$^2$) | 1200 | 1100 | 1000 | 900 | 850 |
|---|---|---|---|---|---|
| I (turley) | 1190.89 | 1097.6 | 1000 | 897.4 | 843.9 |
| % difference | 0.8 | 0.2 | 0 | 0.3 | 0.7 |

To measure the moment of inertia in turley units, oscillator gate 58 and switch 34 are incorporated in electronic counter 31. These circuits realize equation (iv) by gating the counter to indicate the quantity. (P−½ Pcal) which is identical to I since Pcal=2 Ical=2000. There are a number of other ways of subtracting the quantity ½ Pcal from the count P including the use of a preset counter. The present method is by way of example only and is not intended to limit the scope of the invention.

Oscillator gate 58 is designed to block the transmission of pulses from oscillator 55 to counter 53 until the oscillator has produced 10 Pcal (i.e. 10,000) pulses since the frequency divider circuit (57) and said oscillator gate were last reset. Thereafter, said oscillator gate transmits all pulses from said oscillator to said counter until said oscillator gate is reset.

"NAND" gate 62 and inverter 63 form an "AND" gate which will set flip-flop 67 (consisting of cross-coupled "NOR" gates 65 and 64) when the frequency divider reaches a count of 10,000 oscillator pulses. When set, the output of said flip-flop enables "NAND" gate 66 to transmit pulses from oscillator 55, through switch 34 (set to "inertia" setting) to the clock input of counter 53.

At the completion of one cycle of the mechanical oscillation, the state of the output of the divide-by-two circuit in counter control circuit 51 changes, and holds the frequency divider 57 and flip-flop 67 reset for the next cycle of mechanical oscillation.

At the completion of said next cycle of mechanical oscillation, the state of the output of said divide-by-two circuit changes again. This enables frequency divider 57 to operate again, counting oscillation pulses, and oscillator gate 58 again blocks the pulses until the count of frequency divider 57 reaches 10,000, at which time flip-flop 67 is set, "NAND" gate 66 is enabled, and pulses then pass from oscillator 55 to the clock input of counter 53.

The operations of sensing element 30, detector 50, counter control circuit 51 and counter 53 are exactly as before and as described for period measurement.

It can readily be seen that, provided that the oscillator frequency is initially adjusted so that a count of 1000 is displayed with switch 34 set to "period" (corresponding to a count of 10,000, since digital display unit 54 only displays tens, hundreds, thousands, and ten thousands of pulses) then the oscillator actually produces 20,000 pulses during one period of mechanical oscillation of an object having a moment of inertia of 1000 lb-in$^2$. With switch 34 set to "inertia" and operation as described above, counter 53 accumulates a count of 20,000−10,000=10,000 pulses for each count cycle, and 1000 is displayed, for an object having a moment of inertia of 1000 lb-in$^2$.

If a golf club is tested, with switch 34 set to "period" and the number 1100 is displayed, indicating a mechanical period of 22,000 oscillator periods, (since, in period mode, the counter clock input frequency is only half the oscillator frequency) then, if switch 34 is set to "inertia," the count in one period of mechanical oscillation will be 22,000−10,000=12,000 pulses and the number 1200 will be displayed, indicating a moment of inertia of 1200 turley, (equivalent to 1210 lb-in$^2$) thus satisfying equation (iv). It can readily be seen that, for golf clubs having other values of moment of inertia, the circuit will work in a similar way to indicate moment of inertia, as measured in turley units, directly.

The embodiment of FIGS. 1 to 6 is given by way of example only and is not intended to limit the scope of the invention. The example of electronic counter 31 given in FIG. 6 for example is just one of many possible ways of producing indication of period and inertia. Although in the example given, the counter operates for alternate cycles of the mechanical oscillation, and updates the display every two cycles of said oscillation, it is also possible, by modifying the count control circuit, to operate the counter for successive cycles of said oscillation, and update the display every cycle.

It is envisaged that the embodiment of FIGS. 1 to 6 would be used generally by club professionals, custom fitters and the like. Although clubs and club sets would finally be matched in the inertia mode, (i.e. with switch 34 set to "inertia") the period mode (switch 34 set to "period") will be very useful, particularly when matching irons. Generally it is difficult to add or remove weight effectively from iron heads, and a fine trim of inertia is best carried out by adjusting the club length. (increasing or decreasing can be done by prior art methods) In such cases, the amount of shaft to be trimmed is roughly proportional to the desired change in period. Thus, to decrease period by 1%, the shaft length should be reduced by 1%, and so on.

When adjusting the inertia of woods, however, which is most easily done by adjusting head weight, the inertia mode should be selected. In this case the head weight should be changed in rough proportion to the desired change in inertia value. Thus, to decrease inertia by 1%, the head weight should be reduced by 0.8% approx., and so on.

Normally, when clubs are initially made, the shafts are too long and require trimming. FIG. 7 shows a partial view of a new club 11 mounted in holder 13 ready for inertia testing prior to trimming. A sample grip 72 is slit down one side as shown, and is also provided with a hole at the top end through which a shaft can pass. The grip is mounted on the club as shown, with shaft 11 passing through hole 71 in holder 13. The inertia is measured as disclosed above, and the projection of shaft 11 through hole 71 is adjusted until the correct inertia reading is obtained. A first circumferential line 73 is scribed on the shaft in line with the edge of hole 71. The club is then removed from holder 13, grip 72 removed, and a second circumferential line is scribed on the shaft a distance X below said first circumferential line. The distance X previously ascertained by careful measurement of said holder and grip 72, is the distance from the outer face of said holder (where said first circumferential line was scribed) to the normal location of the top end of the shaft of a completed club, when mounted in said holder. The shaft is then cut at said second circumferential line, the correct grip fitted, and the inertia re-checked. The inertia of the small piece of shaft cut off is generally completely negligible, provided it is less than approx. 3 inches long.

FIGS. 8, 9 and 10 depict automated production line methods of adjusting club inertia using the method of the present invention.

In FIGS. 8 and 9, in which the tester of the present method is not shown, except for holder 13, (for the sake of clarity) the club 11 is inserted in the tester by prior art mechanical techniques, is displaced by pneumatic cylinder 81, which is then retracted to start the mechanical oscillation. The counter 53 is connected electrically to electric stepping motor 85, which, after cyl. 81 is extended to stop the oscillation and align the club head, indexes the required amount to displace club 11 the required amount to give the desired inertia. This displacement is achieved by the driving of the input shaft of screw jack 87 via coupling 86 from said stepping motor, push rod 88, mounted on the screw of said jack, being used to displace said club. The process is repeated as required until the desired inertia is obtained. The club is then displaced a further distance X, and pneumatic clamp cylinders 82 are actuated, and these clamp the club against stops 83, resilient pads 84 gripping the club shaft tightly. An abrasive wheel 93, driven by motor 92, is then used to cut off the surplus length of shaft.

In FIG. 10, stepping motor 85, coupling 86 and jack 87 are used to displace electric drill 89, chuck 90 and drill 91 the required amount to trim the weight of the club head to give the required club inertia. The method is the same as that of FIGS. 8 and 9, except that abrasive wheel 93 is not required, and push rod 88 is replaced by the drill assembly (89, 90 and 91)

After adjusting club inertia by methods of FIGS. 8 and 9, or FIG. 10, the club is removed from the holder by prior art mechanical handling methods.

Clearly the possible applications of the present invention are wide, and an apparatus according to the invention could also be used for measuring moment of inertia of baseball bats, and any other objects which, in use, rotate about an axis remote from the center of gravity.

The embodiments of the invention in which an exclusive property or privilege is claimed are defined as follows:

1. An apparatus for measuring the moment of inertia of an object about any axis not passing through the center of gravity of said object, wherein a holder is provided to hold said object with such axis lying vertical, and a single resilient member located at said axis is provided to support said holder and said object in cantilever fashion, said resilient member also allowing only oscillatory rotational movement of said holder and said object in a horizontal plane about said axis, and said resilient member also providing a restoring force proportional to the rotational displacement of said holder and said object away from their neutral position, for which the restoring force is zero, whereby said holder and said object can be displaced and then released, enabling said oscillatory rotational movement to occur, and a single measurement of period of oscillation can be made, from which the moment of inertia about said axis of said object can be calculated without any other measurement of said object being required.

2. A method of measuring moment of inertia using apparatus according to claim 1, where a first object of known moment of inertia is mounted on the apparatus and set into oscillation and the units of period measurement are adjusted so that the period of oscillation measured in said units (P1) is numerically equal to, or related by an exact multiple of 10 to twice the moment of inertia of said first object (2I), then the first object is removed, and a second object of unknown moment of inertia (I2) is mounted on the apparatus and set into oscillation, and electronic means is provided to measure and indicate the quantity: Period of oscillation of second object minus ½ period of oscillation of first object: (P2−½P1): this quantity being equal to the moment of inertia of said second object, within 1% of absolute moment of inertia units (such as lb-in²) provided I/1 .2<I2<1.2I.

* * * * *